March 12, 1968 L. J. WALL 3,372,598

MOTION TRANSMITTING APPARATUS

Filed Feb. 1, 1966

INVENTOR.
LAMAR J. WALL
BY
ATTORNEY

United States Patent Office 3,372,598
Patented Mar. 12, 1968

3,372,598
MOTION TRANSMITTING APPARATUS
Lamar J. Wall, Seal Beach, Calif., assignor to Honeywell
Inc., Minneapolis, Minn., a corporation of Delaware
Filed Feb. 1, 1966, Ser. No. 524,122
9 Claims. (Cl. 74—18.1)

ABSTRACT OF THE DISCLOSURE

A three-way pilot valve with a solenoid operator disposed in a sealed chamber and with a manual actuator for manually operating the solenoid and thereby the valve. This manual actautor including a lever which extends through a wall of the chamber, is pivotable about an axis parallel to the wall, and is axially movable in a direction generally normal to the wall, an operator which engages the outer end of the lever for pivoting the lever and is movable only in a plane parallel to the wall and between two end positions on opposite sides of a position wherein the lever is normal to the wall, and a flexible diaphragm member including a portion surrounding the inner end of the lever and sealing the chamber therearound and, in addition, biasing the lever outwardly from the chamber to provide over-center action as the operator is moved from one end position to the other.

---

This invention relates to motion transmitting apparatus and more particularly to apparatus for transmitting an actuating movement through an aperture in a wall. The apparatus finds particular application in control devices such as fuel valves.

In devices such as fuel control valves, it is often necessary to provide a means for transmitting an actuating movement through a wall from an operating means to the device which is to be operated. Various arrangements have been proposed for accomplishing this purpose but generally a fairly complex structure has been involved and, in many cases, leakage around the motion transmitting apparatus has caused serious problems.

My invention provides a simple structure for transmitting an actuating movement from one side of a wall to the other utilizing a minimum number of parts and, in its preferred form, providing a fluid-tight seal between opposite sides of the wall. Further the structure provides an over-center type of action with two positive control positions and normally precludes maintaining the device in any intermediate positions. This is accomplished by providing a lever member which extends through an aperture in the wall and has opposite ends extending on opposite sides of the wall. A single flexible member has a portion lying along the wall around the aperture and a second portion extending transversely thereto and receiving one end of the lever member.

Figure 1:
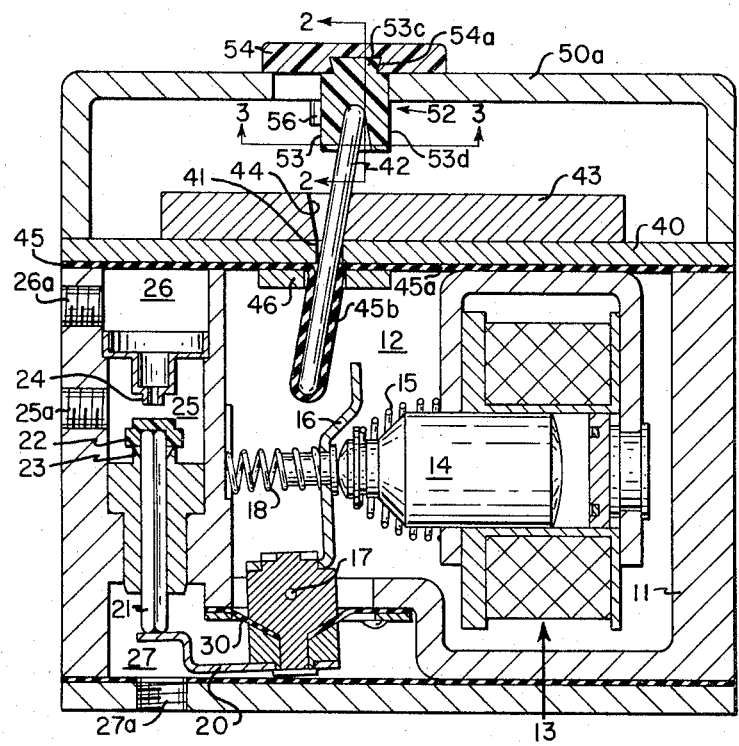
Figure 3:
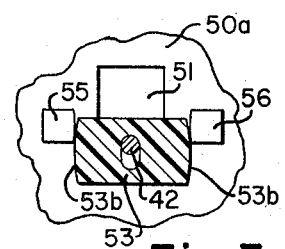
Figure 2:
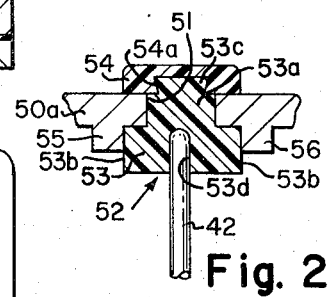
Figure 4:
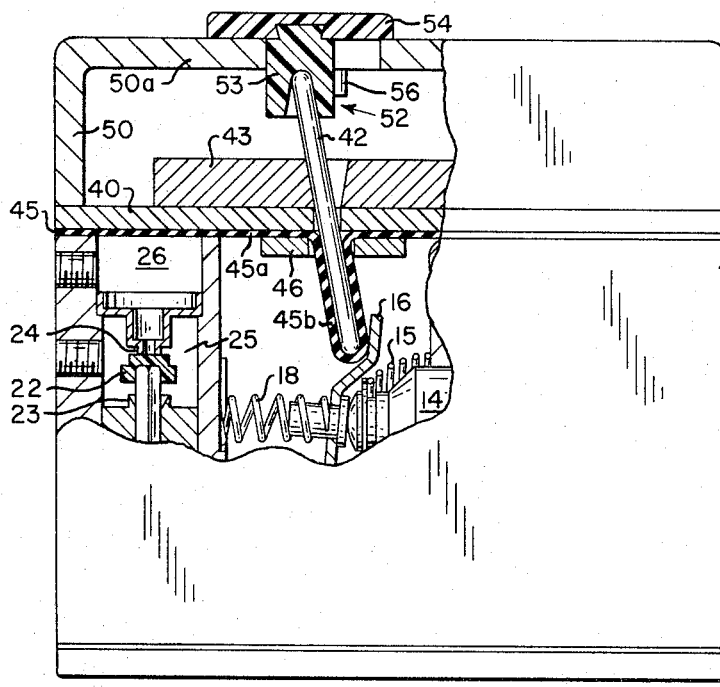

An operating means is operably connected to the other end of the lever and is movable, transversely to the lever, between two end positions, preferably on opposite sides to the "centered" position of the lever wherein it is normal to the wall. In one embodiment the single flexible member acts as a means for positioning the lever member, for biasing it into engagement with the operating means to provide over-center action and, in the preferred form, also performs a sealing function to prevent leakage between opposite sides of the wall. In another embodiment the operating means and the wall have cooperating portions which yieldably retain the operating means in either of the two end positions and render it normally positionable only at the end positions and not at positions therebetween. If desired, these two embodiments may be combined with both the resiliency of the flexible member and the cooperating portions of the operaing means and the wall contributing to the over-center action of the device Various objects and advantages of my invention will become apparent upon reading the following detailed description of a preferred embodiment thereof wherein reference is made to the accompanying drawing. In the drawing: FIGURE 1 is a longitudinal cross-sectional view taken generally through the center of a fuel control valve utilizing my motion transmitting apparatus as a manual operator for the valve; FIGURE 2 is a fragmentary cross-sectional view taken generally along line 2—2 of FIGURE 1; FIGURE 3 is a fragmentary cross-sectional view taken generally along line 3—3 of FIGURE 1; and FIGURE 4 is generally similar to FIGURE 1, but shown in partial cros-section and disclosing the motion transmitting apparatus in another of its positions.

While my invention will also find utility in other devices, I have disclosed it, by way of example, as a manual operator for a solenoid operated three-way control valve of the type which may be used as a diaphragm controller or pilot valve for a pressure operated fuel control valve. In FIGURE 1, the valve is generally designated by the numeral 10 and has a main body portion 11 having a chamber 12 therein. In chamber 12 there is located an operator such as solenoid operator 13 which includes a plunger 14 normally urged to its de-energized position, as disclosed in FIGURE 1, by a spring 15. Spring 15 urges the plunger into operative engagement with a lever 16 and thereby urges lever 16 in a counterclockwise direction about a pivot 17. A spring 18 acts in opposition thereto by urging lever 16 in a clockwise direction. Spring 15 is stronger than spring 18 so that when solenoid 14 is de-energized, spring 15 overcomes spring 18 and rotates lever 16 to the position disclosed in FIGURE 1.

Lever 16 is operably connected, as by another lever 20 and a squared shaft 21, to a valve closure member 22. Member 22 is movable between an annular valve seat 23 which it engages when the operator is in the position disclosed in FIGURE 1 and a second valve seat 24 which it engages when solenoid 14 is energized or when the valve is manually actuated as described hereinafter. A chamber 25, having an outlet port 25a is disposed between valve seats 23 and 24. With the valve in the position disclosed in FIGURE 1, chamber 25 is connected to a chamber 26 having an outlet portion 26a. When the valve assumes its opposite position chamber 25 is connected, through the area around squared shaft 21, to a chamber 27 having an outlet port 27a. Chamber 12 may be filled with a fluid such as oil in which solenoid 13 is submerged and chamber 27 may be sealed therefrom by appropriate means such as a diaphragm 30.

The structure described above is old in the art and forms no part of the present invention. My invention lies in a motion transmitting apparatus, operable from the outside of the valve body, to actuate the valve independently of the operation of solenoid 13. Valve body 11 is covered by a wall 40 which is attached thereto by appropriate means (not shown). Wall 40 has formed therein an aperture 41 in which there is disposed a cylindrical lever or rod 42 having one end extending on either side of the wall. Lever 42 has a cross-sectional dimension somewhat smaller than the size of aperture 41 so that it is pivotable with respect to the wall. A portion 43, which may be a part of wall 40, extends upwardly from the wall and has a tapered opening 44 aligned with aperture 41 and acting as a guide for lever 42. Disposed between wall 40 and housing 11 is a flexible, diaphragm-like member 45 which has a flat portion 45a lying along the underside of wall 40 and providing a seal between wall 40 and housing 11. The diaphragm is held in engagement with wall 40, around aperture 41, by appropriate means such as an apertured member 46 which is suitably secured to the wall. Aligned with aperture 41, flexible member 45 has a second portion 45b which takes the form of a hollow finger-like member extending generally transverse to the flat portion thereof. Portion 45b accepts the inner end of lever 42 and is preferably of such a dimension that member 42 fits snugly therein.

Mounted on top of wall 40, by appropriate means (not shown) is an inverted cup-shaped member 50 which has a wall 50a spaced from and generally parallel to wall 40. Wall 50a has formed therein a generally rectangular opening or slot 51 substantially aligned with aperture 41. Cooperating with slot 51 is a manual operating means 52 operably connected to the upper end of lever 42. Operating means 52 includes a member 53 which has a neck portion 53a disposed in the slot, laterally extending shoulders 53b engaging the under surface of wall 50a on opposite sides of the slot, and a dovetailed portion 53c disposed above the upper surface of wall 50a. The under surface of member 53 has formed therein an opening 53d which accepts the upper end of lever member 42. Opening 53d may be tapered, as shown, in the cross-sectional dimension along the longitudinal axis of the valve. Wall 50a of member 50 is spaced from wall 40 by a distance such that when lever 42 is disposed in opening 53d of member 53, and flanges 53b engage the underside of wall 50a, lever member 42 is pressed downward toward chamber 12, thus flexing portion 45b of the diaphragm member 45. On the upper side of wall 50a a manual operator member 54 is attached to member 53 as by a dovetailed opening 54a into which dovetail 53c is forced.

Lever 42 is pivoted by its coaction with the surface of wall 40 surrounding aperture 41 so that it pivots in a plane generally parallel to wall 40 but is movable transversely to the wall. Slot 51 in member 50 is preferably disposed so that upon movement of the manual operating means 52 from one of its end positions to the other in slot 51, over-center action of lever 42 is obtained. This is accomplished since operating means 52 moves in a plane generally parallel to wall 40 and its two end positions are on opposite sides of the position assumed by lever 42 when it is normal to wall 40.

The necessary bias force for such over-center action may be provided by the resilience of portion 45b of the diaphragm. Alternatively, a separate resilient latching or retaining means for operating means 52 may be provided to yieldably retain said operating means in either of its end positions and render it normally positionable only at the end positions (i.e., to provide over-center action). This is accomplished by providing a pair of spaced bosses 55 and 56 depending from wall 50a on opposite sides of member 53 of operating means 52. The bosses are spaced so that they frictionally engage the longitudinal edges of flanges 53b and are longitudinally disposed so that flanges 53b must pass therebetween as the operating means is moved from one end position to the other. The edges of flanges 53b are made somewhat convex so that the frictional forces between these edges and the bosses is lowest when the operating means is disposed at either of its end positions and is greatest approximately midway between the two end positions. These cooperating portions of the operating means and the wall are constructed so that movement from either end position requires the application of substantial force, sufficient so that movement will normally be fully from one end position to the other. As used herein "normally" means under normal conditions, without making a special effort or using special tools to cause the apparatus to operate differently.

The invention may be utilized with diaphragm 45 alone providing the over-center action of the device or with this action provided solely by the cooperation between flanges 53b and bosses 55 and 56. These two arrangements are considered two separate embodiments of the invention. If desired, these two embodiments may be combined, as shown in the drawing, so that both contribute to the over-center action of the device.

With the manual operating means in the position disclosed in FIGURE 1, the lower end of lever 42, and hence portion 45b of the diaphragm-like member, is disposed in a position wherein it is spaced away from the upper end of lever 16. Solenoid operator 13 can move lever 16 back and forth around its pivot without any interference from the manual operator. However, should it be desired to operate the valve without operation of solenoid 13, as when the power to the solenoid is temporarily interrupted, this can be accomplished by simply moving the manual operating means toward the left. As the operating means is moved from right to left, the lower end of lever 42 moves in a plane generally parallel to wall 40 and moves portion 45b of member 45 into engagement with the upper end of lever 16. This moves lever 16 in opposition to the bias of spring 15 and thus pivots lever 20 in a clockwise direction and moves valve closure member 22 upward, out of engagement with seat 23 and into engagement with seat 24. When it is desired that closure member 22 be returned to its original position, it is only necessary to move the manual operating means to the right, at which time it releases lever 16, allowing spring 15 to return it to the position disclosed in FIGURE 1.

The preferred embodiments described above are shown and described by way of example only and various modifications may become apparent to those skilled in the art in view of my disclosure herein. Therefore, it is intended that my invention not be limited solely by the scope of the appended claims.

I claim:

1. Apparatus for transmitting an actuating movement through an aperture in a wall comprising: lever means disposed in the aperture and having first and second ends extending on opposite sides of the wall, said lever means being pivotable about an axis generally parallel to the plane of the wall and being movable transversely to the plane of the wall in a direction generally normal to the wall; a flexible member including a first portion lying along the wall around the aperture and a second portion extending transversely thereto on one side of the wall, said second portion having a cavity aligned with the aperture in the wall and receiving the first end of said lever means therein; operating means disposed on the other side of the wall from the second portion of said flexible member and operably engaging the second end of said lever means; and means mounting said operating means for translatory movement only in a plane generally parallel to the plane of the wall adjacent the aperture and spaced from the wall such that said operating means pushes said lever means axially in said aperture and flexes said second portion of said flexible member in a direction away from the wall.

2. The apparatus of claim 1 wherein said operating means is movable, in its plane of movement, between two end positions and wherein the apparatus is constructed and arranged so that said operating means is normally positionable only in one or the other of said end positions and not at positions therebetween.

3. The apparatus of claim 2 wherein said two end positions lie on opposite sides of a position wherein said lever means is normal to the wall adjacent the aperture to provide over-center action of the device, and wherein said flexible member is sufficiently resilient so that the flexing thereof provides the bias for such over-center action.

4. The apparatus of claim 3 wherein said flexible member is a one-piece member which is substantially impermeable to fluids, the first portion thereof being a generally flat diaphragm-like portion sealingly engaging the wall and the second portion thereof being a hollow finger-like portion extending generally normal to said first portion with the opening therein providing the cavity for receiving said first end of said lever means.

5. The apparatus of claim 4 wherein the wall forms a part of a valve body surrounding a chamber, with said operating means disposed outside of the chamber and with the second portion of said resilient member extending into the chamber, wherein movement of said operating means between its two positions in its plane of movement causes movement of the first end of said lever, and thereby said second portion of said resilient member, between first and second positions in a generally parallel plane inside the chamber, and wherein said second portion of said resilient member performs a valve operating function in the chamber upon such movement by said operating means.

6. The apparatus of claim 2 wherein said lever means consists of a single lever and the pivot therefor is provided by a surface on a portion of the wall surrounding the aperture so that said lever is unrestrained longitudinally by the pivot and by its operative engagement with said operating means, and wherein said lever is supported longitudinally by said flexible member and is resiliently held thereby in operative engagement with said operating means.

7. The apparatus of claim 6 wherein the wall forms a part of a valve body surrounding a chamber, with said operating means disposed outside of the chamber and with the second portion of said flexible member extending into the chamber, wherein movement of said operating means between its two end positions in its plane of movement causes movement of the first end of said lever means and thereby said second portion of said flexible member, between first and second positions in a generally parallel plane inside the chamber, and wherein said second portion of said flexible member performs a valve operating function in the chamber upon such movement by said operating means.

8. The apparatus of claim 2 wherein said operating means and the wall have cooperating portions which frictionally engage each other and thereby render said operating means normally movable only by application of sufficient force thereto so that it moves fully from one end position to the other.

9. The apparatus of claim 8 wherein said end positions lie on opposite sides of a position at which said lever is normal to the wall adjacent the aperture and wherein said cooperating portions of said operating means and of said wall are constructed so that the frictional forces therebetween are lowest at either of said end positions and a maximum at a point between said end positions to give an over-center action to the apparatus.

References Cited

UNITED STATES PATENTS 2,610,410   9/1952   L'Abée-Lund _____ 74—18.1 X

FRED C. MATTERN, JR., *Primary Examiner.*

F. D. SHOEMAKER, *Assistant Examiner.*